United States Patent
Johansson et al.

(10) Patent No.: US 9,460,544 B2
(45) Date of Patent: Oct. 4, 2016

(54) DEVICE, METHOD AND COMPUTER PROGRAM FOR GENERATING A SYNTHESIZED IMAGE FROM INPUT IMAGES REPRESENTING DIFFERING VIEWS

(75) Inventors: Björn Johansson, Bjärred (SE); Martin Pettersson, Vallentuna (SE); Thomas Rusert, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 188 days.

(21) Appl. No.: 14/237,044

(22) PCT Filed: Oct. 31, 2011

(86) PCT No.: PCT/EP2011/069151
§ 371 (c)(1),
(2), (4) Date: Mar. 20, 2014

(87) PCT Pub. No.: WO2013/020608
PCT Pub. Date: Feb. 14, 2013

(65) Prior Publication Data
US 2014/0192048 A1    Jul. 10, 2014

Related U.S. Application Data

(60) Provisional application No. 61/521,478, filed on Aug. 9, 2011.

(51) Int. Cl.
*G06T 15/00* (2011.01)
*G06T 15/20* (2011.01)
*G06T 15/50* (2011.01)

(52) U.S. Cl.
CPC ............. *G06T 15/00* (2013.01); *G06T 15/205* (2013.01); *G06T 15/503* (2013.01)

(58) Field of Classification Search
CPC ........... H04N 13/0282; H04N 5/2355; H04N 5/235; H04N 5/145; H04N 5/2258; H04N 5/232; H04N 13/0011; H04N 13/0048; H04N 5/265; G06T 5/50; G06T 2207/10016; G06T 5/002
USPC .......................................................... 345/419
See application file for complete search history.

(56) References Cited

U.S. PATENT DOCUMENTS

| 8,831,382 B2 * | 9/2014 | Tolstaya ................ G06T 3/4038 382/278 |
| 2005/0232510 A1 * | 10/2005 | Blake ........................ G06T 5/50 382/275 |
| 2009/0324128 A1 | 12/2009 | Kube et al. |

OTHER PUBLICATIONS

Cesar Morais Palomo: "Interactive image-based rendering for virtual view synthesis form depth images", Jul. 2009.*

(Continued)

*Primary Examiner* — Devona Faulk
*Assistant Examiner* — Kevin Wu
(74) *Attorney, Agent, or Firm* — Murphy, Bilak & Homiller, PLLC

(57) ABSTRACT

The invention relates to a method of generating a synthesized image representing a view of a scene from a first input image representing the view and a second input image representing the view, the synthesized image comprising synthesized image positions, by assigning a synthesized image data value to a synthesized image position. The method comprises determining whether input images have at the synthesized image position data values associated with them. If either one has a data value associated, that data value is assigned to the synthesized image position. If both, an average of both values is assigned. The average is a weighed average, with weighing factors being a function of a distance or distances to a closest image position with no image data value or valid image data value assigned.

14 Claims, 6 Drawing Sheets

(56) References Cited

OTHER PUBLICATIONS

Jens Siepmann et al : "Pixel synchronous measurement of object shape and colour", Jan. 2009.*

Anantrasirichai, C. et al. "Multi-View Image Coding with Wavelet Lifting Scheme." Vision, Video, and Graphics. 2005. 37-44.

Anantrasirichai, C. et al. "Multi-View Image Coding with Wavelet Lifting Scheme." Vision, Video, and Graphics. 2005.

Quang, Nguyen, et al. "Depth image-based rendering from multiple cameras with 3D propagation algorithm." Immerscom. May 27-29, 2009. Berkeley, USA.

Paloma, César Morais. "Interactive image-based rendering for virtual view synthesis from depth images." Masters Dissertation. Rio De Janeiro. Jul. 2009.

Raskar, Ramesh. "Blending Multiple Views." Proceedings of the 10th Pacific Conference on Computer Graphics and Applications. IEEE 2002.

Siepmann, et al. "Pixel synchronous measurement of object shape and colour." Optical Inspection and Metrology for Non-Optics Industries. SPIE vol. 7432 74320Y-1. 2009.

Sun, Wenxiu et al. "Error Compensation and Reliability Based View Synthesis." ICASSP. IEEE 2011. 1349-1352.

* cited by examiner

DEVICE, METHOD AND COMPUTER PROGRAM FOR GENERATING A SYNTHESIZED IMAGE FROM INPUT IMAGES REPRESENTING DIFFERING VIEWS

TECHNICAL FIELD

The invention relates to a device, method and computer program for generating a synthesized image representing a view of a scene from a first input image representing the view and a second input image representing the view.

BACKGROUND

The article "Interactive image-based rendering for virtual view synthesis from depth images"—Rio de Janeiro, July 2009, by César Morais Palomo—discloses virtual view synthesis of a three dimensional scene. As part of the view synthesis, two reference views are merged to one virtual view. The article discusses issues occurring at a border between regions where both reference views have colour pixels and regions where pixels of the virtual view have colour contribution solely from one reference view. The article proposes blending at said border. The method proposed involves a significant amount of calculations.

SUMMARY

It is preferred to have an improved method and/or device for synthesis of three dimensional images.

In a first aspect, a method is provided of generating a synthesized image representing a view of a scene from a first input image representing the view and a second input image representing the view, the synthesized image comprising synthesized image positions, by assigning a synthesized image data value to a synthesized image position. The method comprises determining whether the first input image has a first image data value assigned to a first input image position of the first input image corresponding to the synthesized image position and determining whether the second input image has a second image data value assigned to a second input image position of the second input image corresponding to the synthesized image position. The method further comprises: assigning the first image data value to the synthesized image position if the first image position has the first image data value assigned to it and the second image position has no image data value assigned to it; assigning the second image data value to the synthesized image position if the second image position has the second image data value assigned to it and the first image position has no image data value assigned to it; and assigning a synthesized image data value to the synthesized image position if the first input image position has a first image data value assigned to it and the second input image position has a second image data value assigned to it. The determining of the synthesized image data value comprises: determining a distance between the synthesized image position and a further image position where a corresponding further first input image position or a corresponding further second input image position does not have an image data value assigned to it; calculating the synthesized image data value by calculating a weighed average of the first image data value and the second image data value, the weighing being a weighing function of the determined distance.

By making the weighing a function of the distance between the synthesized image position and a closest image position that does not have an image data value assigned to it, a smooth transition is provided between a first image area where only the first or second input image has image data values assigned to positions and a second area where both the first and second input image have image data values assigned to positions. This prevents artefacts like halos or second contours around objects or at least reduces such effects.

An embodiment of the method further comprises if the first image position has the first image data value assigned to it, determining for the first input image position a first validity distance between the first image position and a first non value image position of the first input image which first non value image position is an image position of the first input image that is closest to the first image position and has no image value assigned to it and; if the second image position has the second image data value assigned to it, determining for the second input image position a second validity distance between the second image position and a second non value image position of the second input image which second non value image position is an image position of the second input image that is closest to the second image position and has no image value assigned to it; wherein the weighing function is a function of the first validity distance and the second validity distance.

This embodiment allows a particular smooth transition between the first area and the second area as discussed above. For a synthesised image position in the second area close to the first area where the first input image has no image data value (or at least no valid image data value) assigned to it, the image data value of the second input image has a higher weighing factor value than the image data value of the first input image. The same applies in an analogous way to a synthesised image position in the second area close to the first area where the second input image has no image data value assigned to it.

In another embodiment of the method, the first input image has a first input depth map associated with it and the second input image a second input depth map associated with it, if the first input image position has a first image data value assigned to it and the second input image position has a second image data value assigned to it, comprising: retrieving a first depth value from the input first depth map corresponding to the first input image position; retrieving a second depth value from the second input depth map corresponding to the second input image position. The method further comprises determining a depth difference between the first depth value and the second depth value; determining which of the first input image position and the second input image position corresponds to a foreground object if the depth difference is above a pre-determined depth threshold; and assigning an image data value to the synthesized image position that corresponds to an input image data value of the input image position corresponding to a foreground object.

In this embodiment, priority is given to image data values of foreground objects. In most films, foreground objects are the most important.

In a further embodiment, the method the first input image has a first input depth map associated with it and the second input image a second input depth map associated with it, the first input depth map comprising depth data values corresponding to first input image positions and the second input depth map comprising depth data values corresponding to second input image positions. The method further comprises: determining whether the first input depth map has a first depth data value assigned to the first input image position; determining whether the second input depth map has a second depth data value assigned to the second input image position. The method also comprises assigning the first depth data value to a synthesized depth map position of a synthesized depth map if the first image position has the first depth data value assigned to it and the second image position has no depth data value assigned to it, the synthesized depth map being associated with the synthesized image and the synthesized depth map position corresponding to the synthesized image position; assigning the second depth data value to the synthesized depth map position if the second image position has the second depth data value assigned to it and the first image position has no depth data value assigned to it; assigning a synthesized depth data value to the synthesized depth map position if the first input image position has a first depth data value assigned to it and the second input image position has a second depth data value assigned to it. The determining of the synthesized depth data value comprises determining a distance between the synthesized image position and a further image position where a corresponding further first input image position or a corresponding further second input image position does not have an depth data value assigned to it and calculating the synthesized depth data value by calculating a weighed average of the first depth data value and the second depth data value, the weighing being a weighing function of the determined distance.

In this way, a synthesised depth map is generated analogously to synthesis of the synthesised image.

In yet a further embodiment, the view is a three-dimensional view and the scene is a three-dimensional scene. The method comprises receiving a first raw input image representing a first raw view of the three-dimensional scene and a first raw depth map associated with the first raw input image; receiving a second raw input image representing a second raw view of the three-dimensional scene and a second raw depth map associated with the second raw input image; and receiving a virtual camera position corresponding to a virtual view of the three-dimensional scene. The method further comprises generating the first input image from the first raw input image by calculation of shifts of first image data positions associated with a change of view point from the first raw view to the virtual view; and generating the second input image from the second raw input image by calculation of shifts of first image data positions associated with a change of view point from the second raw view to the virtual view.

The method discussed and all variations thereof are particularly advantageous for reconstruction of 3D images, either as sole images or as part of a stream of audiovisual data. In such stream, comprising information on a 3D film, at least two images recorded from two different positions, with corresponding different camera positions are provided. From the images from different positions and a virtual camera position, a new image may be calculated, showing the recorded scene as viewed from the virtual camera position. New image is synthesised by processing the two raw input images and camera positions and merging the results.

Another aspect provides a device for generating a synthesized image representing a view of a scene from a first input image representing the view and a second input image representing the view, the synthesized image comprising synthesized image positions by assigning a synthesized image data value to a synthesized image position. The device comprises: a receiving unit arranged to receive the first input image and the second input image and a processing unit. The processing unit is arranged to: determine whether the first input image has a first image data value assigned to a first input image position of the first input image corresponding to the synthesized image position; determine whether the second input image has a second image data value assigned to a second input image position of the second input image corresponding to the synthesized image position; assign the first image data value to the synthesized image position if the first image position has the first image data value assigned to it and the second image position has no image data value assigned to it; assign the second image data value to the synthesized image position if the second image position has the second image data value assigned to it and the first image position has no image data value assigned to it; assign a synthesized image data value to the synthesized image position if the first input image position has a first image data value assigned to it and the second input image position has a second image data value assigned to it. In order to determine of the synthesized image data value, the processing unit is further arranged to determine a distance between the synthesized image position and a further image position where a corresponding further first input image position or a corresponding further second input image position does not have an image data value assigned to it; calculate the synthesized image data value by calculating a weighed average of the first image data value and the second image data value, the weighing being a weighing function of the determined distance.

A further aspect provides a computer program for generating a synthesized image representing a view of a scene from a first input image representing the view and a second input image representing the view, the synthesized image comprising synthesized image positions, by assigning a synthesized image data value to a synthesized image position. The computer program comprises software instructions that, when executed by a computer perform: determining whether the first input image has a first image data value assigned to a first input image position of the first input image corresponding to the synthesized image position and determining whether the second input image has a second image data value assigned to a second input image position of the second input image corresponding to the synthesized image position. The method further comprises: assigning the first image data value to the synthesized image position if the first image position has the first image data value assigned to it and the second image position has no image data value assigned to it; assigning the second image data value to the synthesized image position if the second image position has the second image data value assigned to it and the first image position has no image data value assigned to it; and assigning a synthesized image data value to the synthesized image position if the first input image position has a first image data value assigned to it and the second input image position has a second image data value assigned to it. The determining of the synthesized image data value comprises: determining a distance between the synthesized image position and a further image position where a corresponding further first input image position or a corresponding further second input image position does not have an image data value assigned to it; calculating the synthesized image data value by calculating a weighed average of the first image data value and the second image data value, the weighing being a weighing function of the determined distance.

BRIEF DESCRIPTION OF THE DRAWINGS

The above will now be discussed in further details in conjunction with Figures. In the Figures.

FIG. 4 B: shows a second graph showing weighing factors as a function of distance;

FIG. 4 C: shows a third graph showing weighing factors as a function of distance.

DETAILED DESCRIPTION

Figure 1:
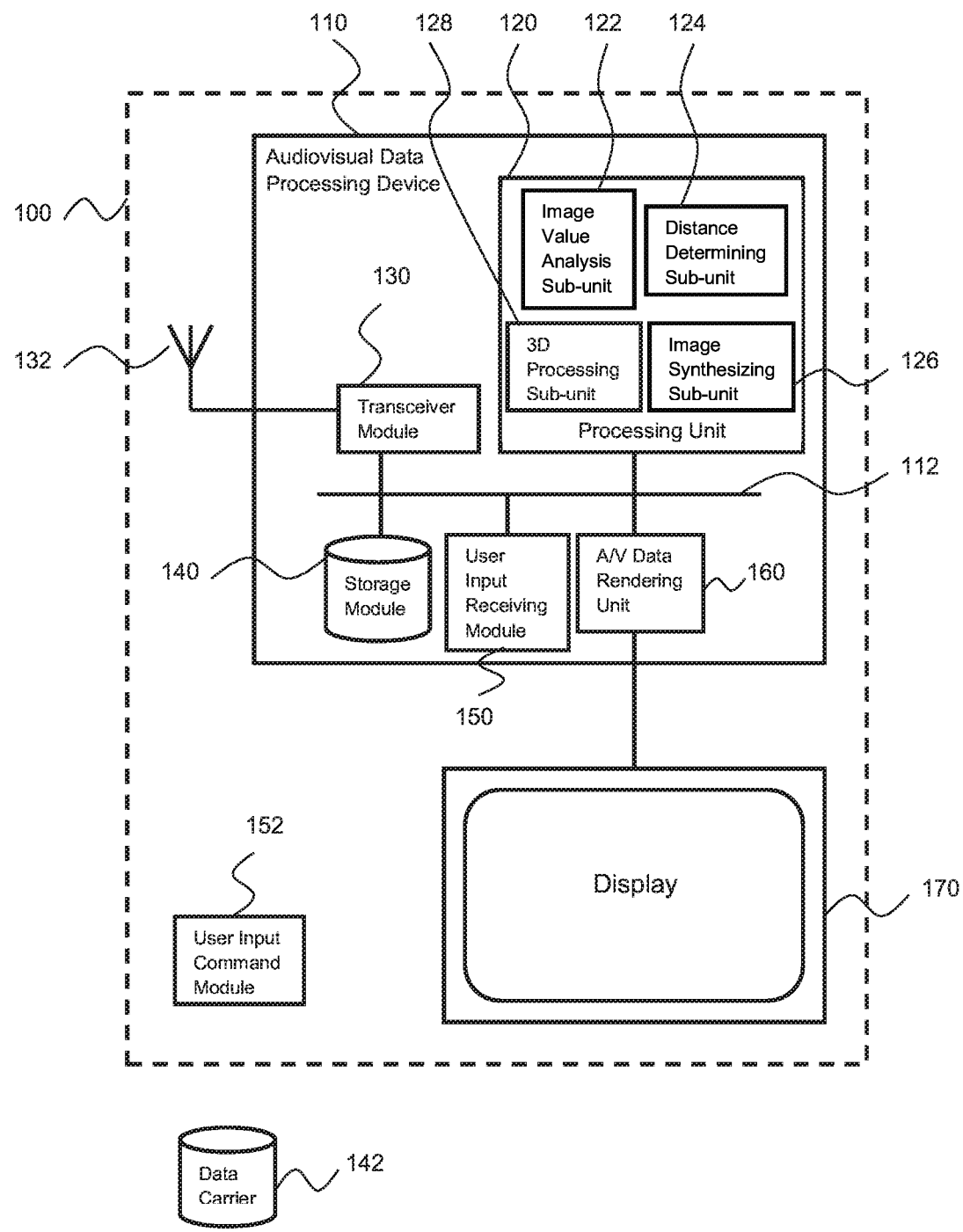
FIG. 1: shows an audiovisual data reproduction system FIG. 2 A: shows a flowchart depicting a method for generating three-dimensional images.

FIG. 1 discloses an audiovisual data reproduction system 100. The audiovisual data reproduction system 100 comprises an audiovisual data processing device 110, a display 170, an antenna 132 and a user input command module 152. The data processing device 110 comprises a processing unit 120, a transceiver module 130 connected to the antenna 132, a storage module 140, a user input receiving module 150 for receiving user input from the user input command module 152 and a audiovisual data rendering unit 160. The various components of the audiovisual data processing device 110 are operatively connected to one another via a central bus system 112.

The processing unit 120 comprises an image value analysis sub-unit 122, a distance determining sub-unit 124, an image synthesising sub-unit 126 and a 3D processing sub-unit 128. The various sub-units are in a first embodiment hardwired and pre-defined. In another embodiment, the various sub-units are defined by programming the processing unit 120 to execute the various methods discussed below. The processing unit 120 is in that embodiment programmed by means of computer executable instructions as part of one or more computer programs stored on a data carrier 142.

The transceiver module 130 is arranged to receive audiovisual data via the antenna 132. In this embodiment, audiovisual data is provided modulated on a radio-frequency signal. In another embodiment, the transceiver module 130 receives audiovisual data via a TCP/IP network or an ADSL line. In yet another embodiment, the transceiver module 130 receives audiovisual data via a cable television network. The transceiver module 130 is arranged downmix the signal received and to provide the audiovisual data as a baseband signal. In case the audiovisual data is not received by a radio signal but rather via a fixed line connection, the antenna 132 may be omitted.

The baseband signal with audiovisual data is provided to the processing unit 120 via the central bus system 112 for processing. The processing comprises one or more operations, including, but not limited to, decompression, 3D image reconstruction, decryption, time stretching or compression, other, or a combination thereof. These operations may be executed automatically, upon instructions or other meta-data provided in the audiovisual data, upon commands received from a user via the user input receiving module 150 upon receiving user commands from the user input command module 152, other, or a combination thereof.

The processed audiovisual data is subsequently provided to the audiovisual data rendering unit 160 for providing a signal that can be displayed by the display 170. The display 170 may be a stand-alone device, as well as the audiovisual data processing device 110 and the user input command module 152. One or more devices may also be integrated to form components of one single device as the audiovisual data reproduction system 100. This embodiment is particularly advantageous in mobile applications, where the audiovisual data reproduction system 100 is provided as a tablet computer, a mobile telephone and a smartphone in particular, a laptop computer or another device.

Figure 2:
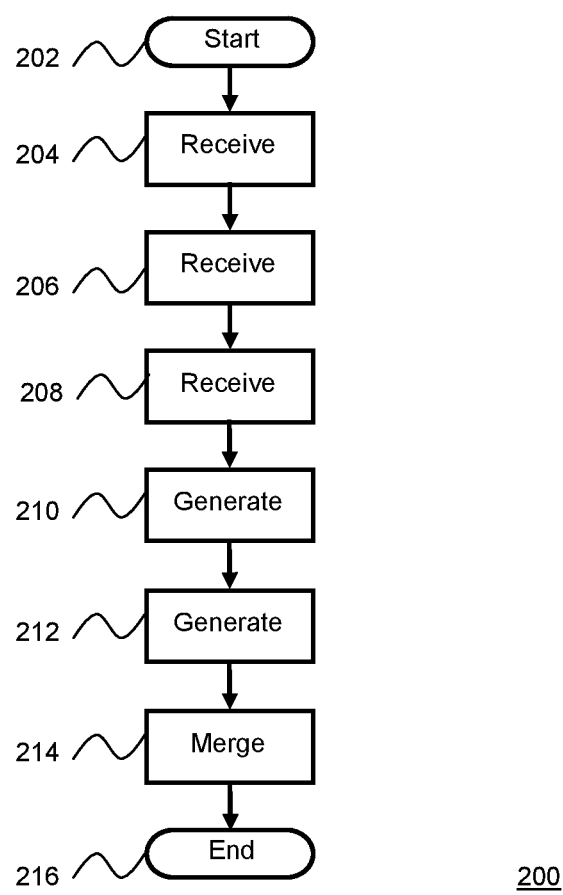
FIG. 2 B: shows a flowchart depicting a method for merging images to one image.
Figure 2:
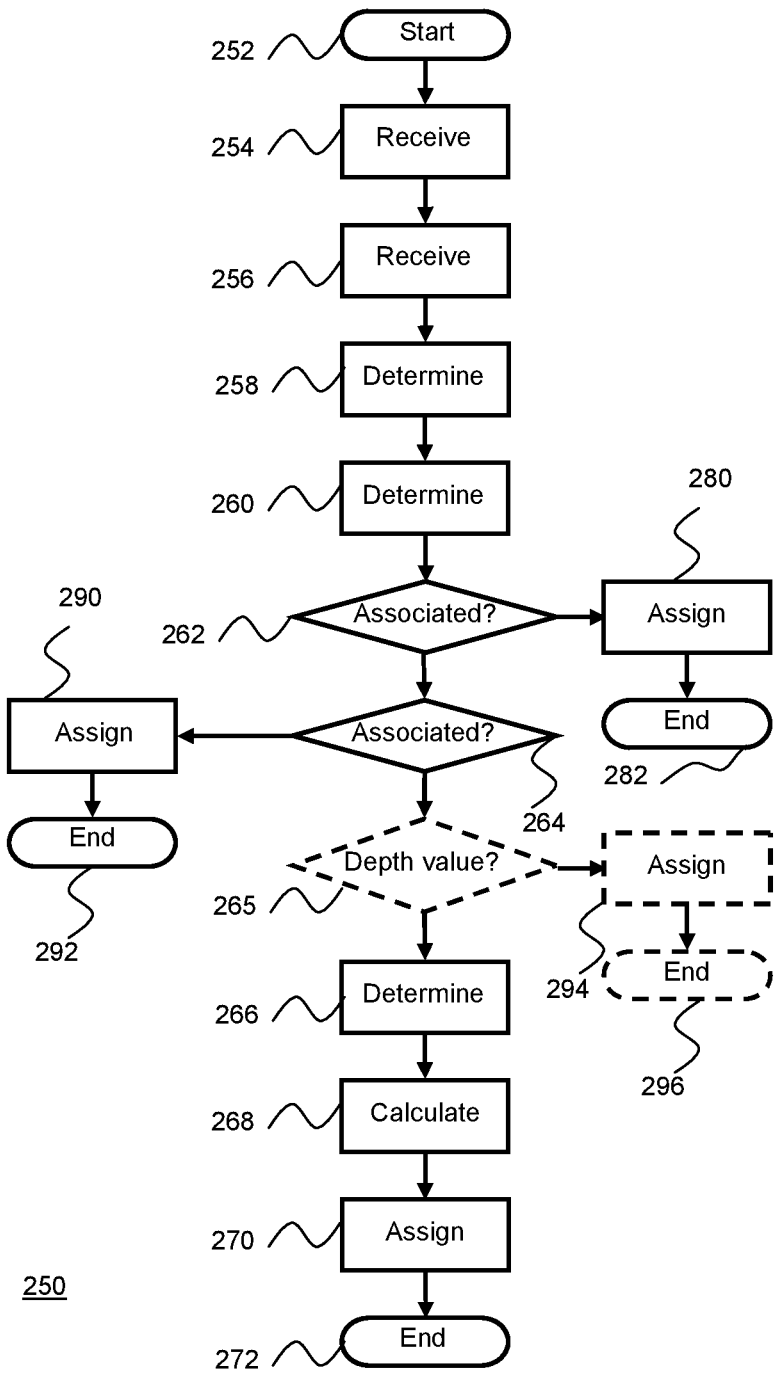

FIG. 2 A shows a flowchart 200 depicting a method executable by the audiovisual data reproduction system 100 and the audiovisual data processing device 110 in particular. The method depicted by the flowchart 200 is a method for generating three-dimensional images as part of audiovisual data for reproduction by the screen 170.

FIG. 2 A starts at terminator 202 and continues with step 204 by receiving a first raw input image representing a first view of a three-dimensional scene, a first raw depth map associated with the first raw input image and a first camera position. In step 206, a second raw input image representing a second view of the three-dimensional scene is received, with a second raw depth map associated with the second view and a second camera position. The camera positions may be provided relative to one another or by means of absolute coordinates. It is noted that though this description generally refers to embodiments where a synthesized image is generated by merging two input images, embodiments with more than two input images with corresponding depth maps and camera positions can also be envisaged. The first raw input image and the second raw input image are preferably decompressed images. Bitmap image format is a particularly preferred format for the first raw input image and the second raw input image.

The depth maps provide for each pixel in the raw input images a depth value. The depth values indicate the distance of an object a part of which the pixel represents relative to the camera. Alternatively, depth values are provided for a region of the image which region is larger than a single pixel. So for each position in the raw input images, the corresponding depth map provides a depth value, whether on a per-pixel level or a higher level.

Upon reception of a virtual camera position in step 208 representing a virtual view on the three-dimensional scene, a first input image and corresponding first input depth map are generated in step 210 and a second input image and corresponding second input depth map are generated in step 212. The first input image represents a view of the three-dimensional scene from the viewpoint of the virtual camera, calculated from the first raw input image. The second input image represents a view of the three-dimensional scene from the viewpoint of the virtual camera, calculated from the second raw input image. The first input image is generated from the raw first input image by calculation of shifts of pixels, which shift is associated with a shift of viewpoint from the first camera position to the second camera position. The first raw input image and the first raw depth map serve as a basis for these calculations. Depth values remain associated with the pixel they refer to in the raw input image, resulting in a first input depth map corresponding to the first input image. In this embodiment, the step 210 and the step 212 are performed by the 3D processing sub-unit 128.

Such shift may result in the first input image having regions becoming visible that were not visible in the first raw input image. This applies to regions of a background of the three-dimensional scene that were hidden by a foreground object when viewed from the first camera position. Such regions are referred to as disocclusion regions that are visible from the virtual camera position due to the shift in camera position. For such disocclusion regions, no pixel data or image data is available from the first raw input image. This results in the first input image having a region and/or pixels not having image data values associated with it—or at least not valid image data associated with it.

The second raw input image is processed in a equivalent way, using the second raw input image the second raw depth map, the second camera position and the virtual camera position. This results in the second input image. The second input image will in at least most cases also have disocclusion regions.

The disocclusion regions of the first input image and the disocclusion regions of the second input region do in virtually all cases not overlap. Hence, for a synthesized image representing a synthesized view of the three dimensional scene with the virtual camera as viewpoint, at least one data value is available for each position of the synthesized image. The first input image and the second input image are merged to form the synthesized image in step 214, after which the process is ended in terminator 216.

Figure 3:
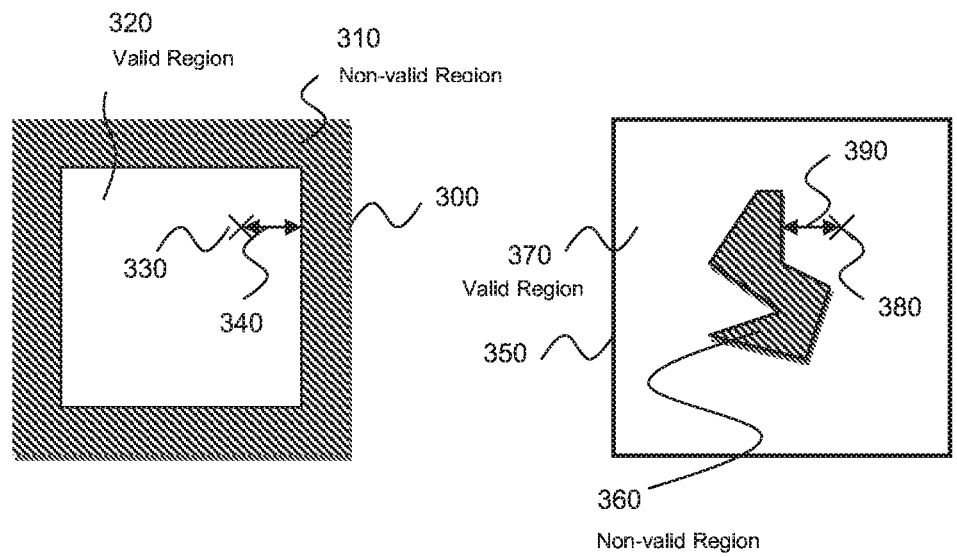
FIG. 3: shows two input images for generating a synthesized image.

FIG. 2 B shows a flowchart 250 depicting the merging process 214 in further detail. The flowchart 250 will be discussed in conjunction with FIG. 3, among others. FIG. 3 discloses an exemplary first input image 300 and an exemplary second input image 350. The first input image 300 comprises a first non-valid region 310 comprising image positions—single pixels or multi-pixel regions—having no data value assigned to them or at least no valid image value assigned to them. This may be because the first non-valid region 310 is a disocclusion region. In another embodiment, the first input image 300 is a sparse input image in accordance with the disclosure of WO 2009/001255. The first input image 300 further comprises a first valid region 320 comprising image positions having a valid image data value assigned to them. The valid image data may be provided as indexed colours (GIF format), RGB values or other colour coding formats. In the first valid region 320, a first image position 330 is available, corresponding to a synthesized image position for which an image data value is to be calculated.

The second input image 350 comprises a second non-valid region 360 comprising image positions having no data value assigned to them. The second input image further comprises a second valid region 370 comprising image positions having a valid image data value assigned to them. In the second valid region 370, a second image position 380 is available, corresponding to the synthesized image position for which an image data value is to be calculated—and hence corresponding to the first image position 330.

The merging process start in a terminator 252, followed by receiving the first input image in step 254 and the second input image in step 256.

In step 258 is determined for a given position of the synthesized image whether the first input image 300 has an image data value associated with it at a first input image position corresponding to the given position of the synthesized image. In this embodiment, this step is performed by the image value analysis sub-unit 122.

In step 260 is determined for a given position of the synthesized image whether the second input image 300 has an image data value associated with it at a second input image position corresponding to the given position of the synthesized image. In this embodiment, this step is performed by the image value analysis sub-unit 122.

If the first input image has no image data value associated with is at the first input image position, the process branches in decision 262 to step 280 where the image data value assigned to a second input image position of the second input image, corresponding to the given position of the synthesized image, will be assigned to the given position of the synthesized image. Subsequently, the process ends in terminator 282.

If the second input image has no image data value associated with is at the second input image position, the process branches in decision 264 to step 290 where the image data value assigned to a first input image position of the first input image, corresponding to the given position of the synthesized image, will be assigned to the given position of the synthesized image. Subsequently, the process ends in terminator 292.

If both the first input image and the second input image both have data values associated with positions corresponding to the given position of the synthesized image, the difference in depth values between the first input image position and the second input image position is determined by obtaining corresponding depth values from the first input depth map and the second input depth map. In case the difference in depth is above a pre-determined threshold, the process branches in decision 265 to step 294. In step 294, the image data value associated with the input image position closest to the camera is selected for assignment to the synthesized image position. Subsequently, the process ends in terminator 296.

If both the first input image and the second input image have data values associated with positions corresponding to the given position of the synthesized image, validity distances are determined in step 266. A first validity distance 340 between the first image position 330 and another image position of the first image 300 having no image data value assigned to it which is closest to the first image position 330 is determined in step 266. In this embodiment, this step is performed by the distance determining sub-unit 124.

Also in step 266 a second validity distance 390 between the second image position 380 and a further image position of the second image 350 having no image data value assigned to it which is closest to the second image position 380. In this embodiment, this step is performed by the distance determining sub-unit 124. In this way, distance value maps may be generated for the first input image 300 and the second input image 350 by assigning a validity distance to every position of the first image 300 and the second image 350 that has a valid image data value. These validity distances may be stored in a matrix, list, or any other data structure.

Using these validity distances, a synthesized image data value is calculated to be assigned to the given position of the synthesized image in step 268. In this embodiment, this is done by calculating a weighed average of the first image data value assigned to the first input image position and the second image data value assigned to the second input image position. It is noted that the first input image position and the second input image position correspond to the given image position of the synthesized image. The weighing is determined by the first validity distance and the second validity distance. This is provided by the following formula:

$$S_{synthesised}(x, y) = \frac{S_{first}(x, y) * D_{first}(x, y) + S_{second}(x, y) * D_{second}(x, y)}{D_{first}(x, y) + D_{second}(x, y)}$$

In the formula:

$S_{synthesized}$ is the value calculated and assigned to the given position of the synthesized image;

$S_{first}$ is the image data value assigned to the first input image position, $D_{first}$ is the validity distance for the first input image position, $S_{second}$ is the image data value assigned to the second input image position; and $D_{second}$ is the validity distance for the second input image position.

Figure 4:
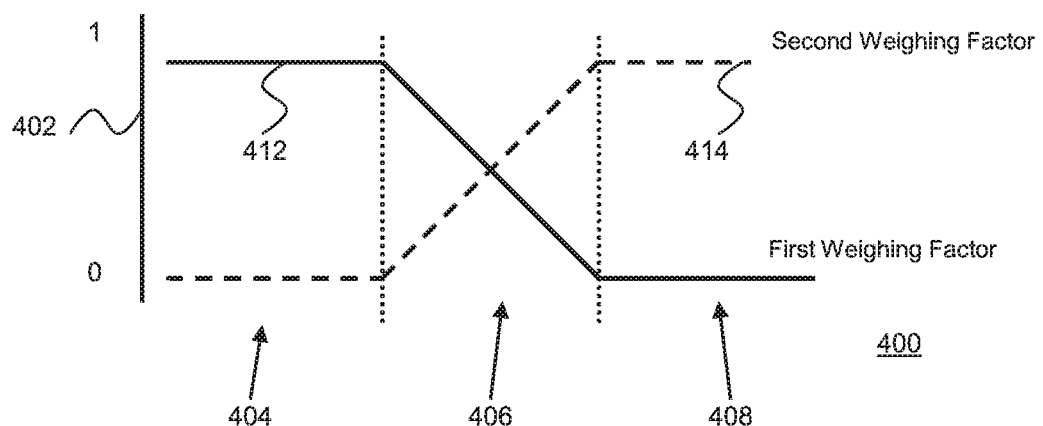
FIG. 4 A: shows a first graph showing weighing factors as a function of distance.
Figure 4:
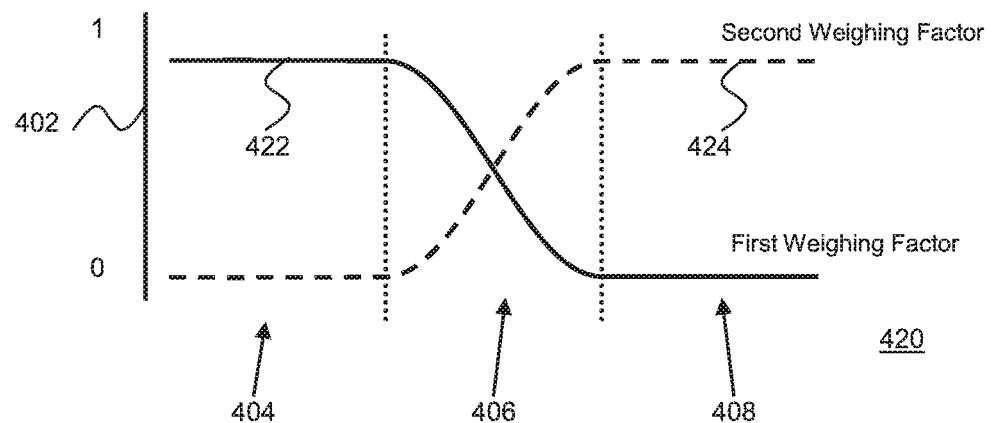
Figure 4:
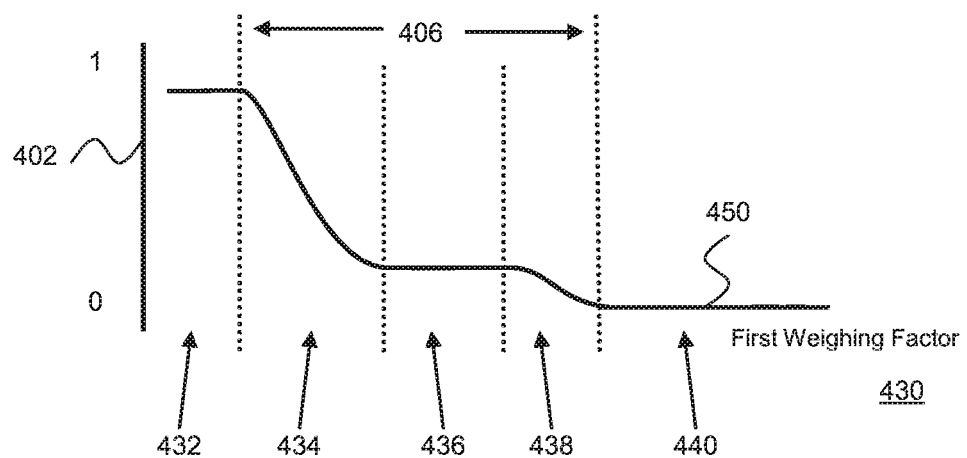

This formula results in weighing as depicted by FIG. 4 A. FIG. 4 A shows a first graph 400 with a first linear curve 412 and a second linear curve 414, indicating values from 0 to 1 along a y-axis 402. On the horizontal axis, image positions are provided. For a first graph area 404, only the first input image has image data values assigned to image positions. For a second graph area 406, both the first input image and the second input image have image data values assigned to image positions. For a third graph area 408, only the second input image has image data values assigned to image positions. The first linear curve 412 indicates a first weighing factor for image data values assigned to positions of the first input image and the second linear curve 414 indicates a second weighing factor for image data values assigned to positions of the second input image.

In another embodiment, weighing factors depend on the validity distances in a non-linear way. This is depicted in FIG. 4 B. FIG. 4 B shows a second graph 420 with a first non-linear curve 422 and a second non-linear curve 424 indicating values from 0 to 1 along a y-axis 402. On the horizontal axis, image positions are provided. For a first graph area 404, only the first input image has image data values assigned to image positions. For a second graph area 406, both the first input image and the second input image have image data values assigned to image positions. For a third graph area 408, only the second input image has image data values assigned to image positions.

Other than in the first graph 400, the curves in the second graph 420 indicate that close to a boundary between a first region where both input images have valid image values and a second region where only one of the input images has valid input images, image data values of the image having valid data values in the second region have a higher weigh than attributed with the weighing factors indicated by the first graph. An advantage of this is that this results in smoother edges in the synthesized image. In one particular embodiment, the weighing values for image data values for calculating the image data value for the synthesized image position is provided by the following formulas:

$$W_{first}(x, y) = \frac{1}{2}\left(1 - \cos\left(\pi \cdot \frac{D_{first}(x, y)}{D_{first}(x, y) + D_{second}(x, y)}\right)\right)$$

$$W_{second}(x, y) = \frac{1}{2}\left(1 - \cos\left(\pi \cdot \frac{D_{second}(x, y)}{D_{first}(x, y) + D_{second}(x, y)}\right)\right)$$

And the data value of the synthesized image is calculated with the following formula:

$$S_{synthesised}(x,y) = S_{first}(x,y) * W_{first}(x,y) + S_{second}(x,y) * W_{second}(x,y)$$

In the formulas:

$S_{synthesized}$ is the value calculated and assigned to the given position of the synthesized image;

$S_{first}$ is the first image data value assigned to the first input image position, $D_{first}$ is the validity distance for the first input image position, $S_{second}$ is the second image data value assigned to the second input image position;

$D_{second}$ is the validity distance for the second input image position.

$W_{first}$ is the weighing value associated with the first image data value; and $W_{second}$ is the weighing value associated with the second image data value.

An advantage of calculating weighing factors in accordance with the formulas directly above is that the functions for the weighing factors are continuous in all derivatives, resulting in particularly smooth edges and other transitions.

FIG. 4 C shows a third graph 430 with a third non-linear curve 450 indicating values from 0 to 1 along a y-axis 402. On the horizontal axis, image positions are provided. For a first graph area 432, only the first input image has image data values assigned to image positions. For a third graph area 440, only the second input image has image data values assigned to image positions. For a second graph area 406, both the first input image and the second input image have image data values assigned to image positions. For reasons of clarity, only the weighing factor for the first image data values as a function of image position and distance to image position with no valid image data value has been depicted. A person skilled in the art will appreciate that the weighing function for the second image data values for a specific position can be calculated directly so as the sum of both weighing factors will always be 1.

The second graph area 406 has been sub-divided into a first graph sub-area 434, a second graph sub-area 436 and a third graph sub-area 438. For the first graph sub-area 434, the weighing factors for image data values of both images are functions of the distance to the nearest image position with no valid image data value. For the second graph sub-area 436, the weighing factors are constant and independent from any validity distances. However, for image positions corresponding to the second graph sub-area 436 the validity distances need to be calculated to determine whether the image position corresponds to a constant weighing factor or not.

Preferably, the weighing factor has a constant value if at least one—or both—the validity distances for first and second image positions have values above a pre-determined threshold. In other words: for specific positions in the synthesized image where the corresponding positions of the first input image and the second input image both have a valid image data value assigned to it, being at least a pre-determined distance away from a position where only the first or second input image have valid image data values assigned to it, the values of the weighing factors are constant and independent from the validity distances.

And for the third graph sub-area 438, the weighing factors for image data values of both images are functions of the distance to the nearest image position with no valid image data value again. Though the graph 430 is shown with the third non-linear curve 450, a person skilled in the art will appreciate that in other embodiments, curves in the first graph sub-area 434 and the third graph sub-area 438 can be provided as linear curves as well.

Having thus calculated the image data value for the given position of the synthesized image in step 268, the calculated image data value is assigned to the given position of the synthesized image in step 270, thus creating the synthesized image. In this embodiment, this step is performed by the image synthesising sub-unit 126. The process ends in terminator 272.

The process depicted by the second flowchart 250 is preferably repeated for every image position of the synthesized image—so also for corresponding positions of the first input mage and the second input image. In a variation of the process depicted by the second flowchart 250, the decisions indicated by reference numerals 262 and 264 are omitted. This will have the same effect, as the validity distance for an image position having no valid image data value associated with it will be zero and the image data value will have a weighing factor value of zero. However, to prevent issues with non-valid image data values, it is preferably well determined to check whether each position of an image as a valid data value associated with it, followed by at least one of the decisions indicated by reference numerals 262 and 264 (FIG. 2 B).

Figure 5:
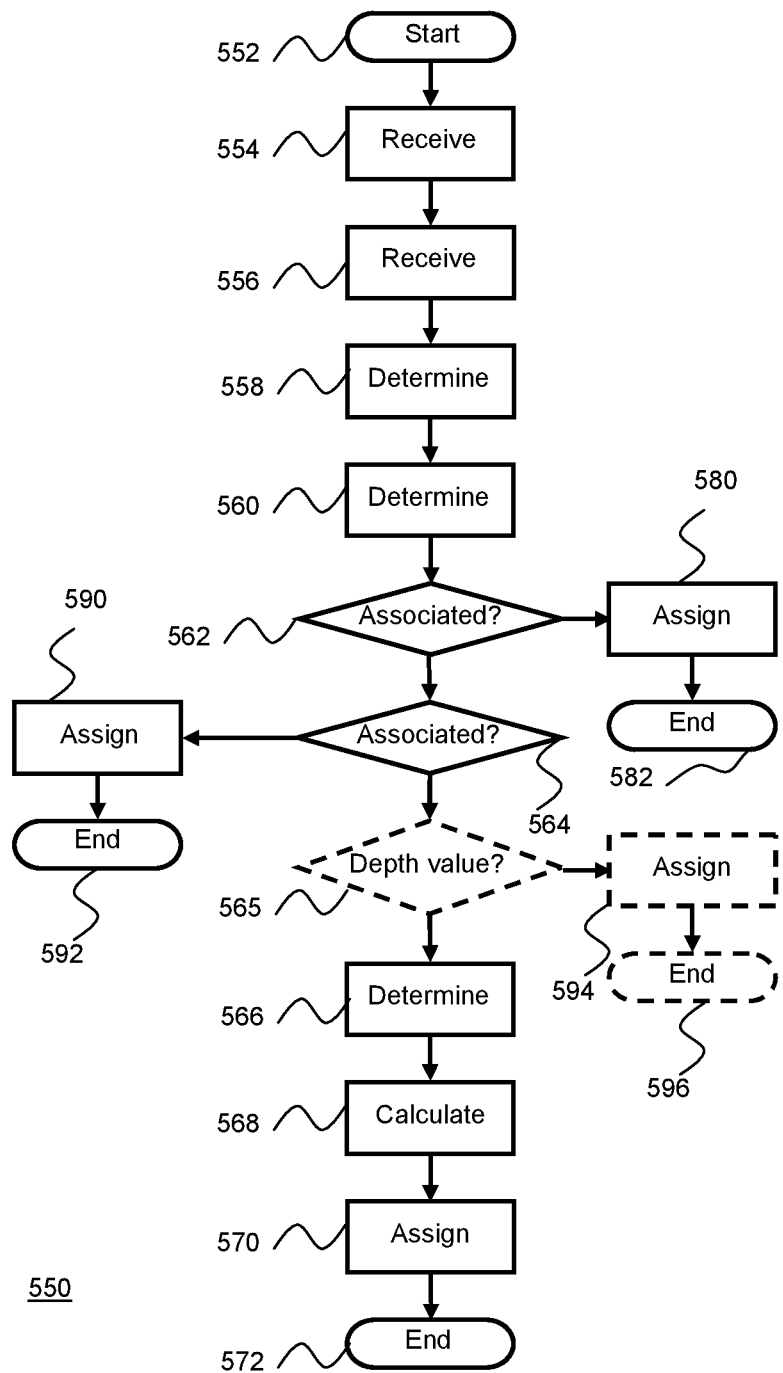
FIG. 5: shows a flowchart depicting a method for merging two depth maps to one depth map.

In case the synthesized image is to be accompanied with an associated depth map, a synthesized depth map is generated by a depth map generation process analogous to the process employed for generating a synthesized image. FIG. 5 shows a third flowchart 550 analogous to the second flowchart 250 depicted by FIG. 2 B. The process steps of the third flowchart 550 are the same as in the second flowchart 250, where instead of image data values of the first input image and the second input image, image depth values of the first input depth map and the second input depth map serve as input. Likewise, instead of a synthesized image, a synthesized depth map is generated.

In summary, the invention relates to a method of generating a synthesized image representing a view of a scene from a first input image representing the view and a second input image representing the view, the synthesized image comprising synthesized image positions, by assigning a synthesized image data value to a synthesized image position. The method comprises determining whether input images have at the synthesised image position data values associated with them. If either one has a data value associated, that data value is assigned to the synthesized image position. If both, an average of both values is assigned. The average is a weighed average, with weighing factors being a function of a distance or distances to a closest image position with no image data value or valid image data value assigned.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa. When data is being referred to as audiovisual data, it can represent audio only, video only or still pictures only or a combination thereof, unless specifically indicated otherwise in the description of the embodiments.

In the description above, it will be understood that when an element such as layer, region or substrate is referred to as being "on", "onto" or "connected to" another element, the element is either directly on or connected to the other element, or intervening elements may also be present.

Furthermore, the invention may also be embodied with less components than provided in the embodiments described here, wherein one component carries out multiple functions. Just as well may the invention be embodied using more elements than depicted in FIG. 1, wherein functions carried out by one component in the embodiment provided are distributed over multiple components.

A person skilled in the art will readily appreciate that various parameters disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

The invention claimed is:

1. A method of generating a synthesized image representing a view of a scene from a first input image representing the view and a second input image representing the view, the synthesized image comprising synthesized image positions, by assigning a synthesized image data value to a synthesized image position, comprising:
   determining whether the first input image has a first image data value assigned to a first input image position of the first input image corresponding to the synthesized image position;
   determining whether the second input image has a second image data value assigned to a second input image position of the second input image corresponding to the synthesized image position;
   assigning the first image data value to the synthesized image position if the first image position has the first image data value assigned to it and the second image position has no image data value assigned to it;
   assigning the second image data value to the synthesized image position if the second image position has the second image data value assigned to it and the first image position has no image data value assigned to it;
   assigning a synthesized image data value to the synthesized image position if the first input image position has a first image data value assigned to it and the second input image position has a second image data value assigned to it, determining of the synthesized image data value comprising:
      determining a distance between the synthesized image position and a further image position where a corresponding further first input image position or a corresponding further second input image position does not have an image data value assigned to it; and
      calculating the synthesized image data value by calculating a weighted average of the first image data value and the second image data value, the weighting being a weighting function of the determined distance; and
   generating the synthesized image based on the calculated synthesized image data value.

2. The method of claim 1, comprising:
   if the first image position has the first image data value assigned to it, determining for the first input image position a first validity distance between the first image position and a first non-value image position of the first input image, which first non-value image position is an image position of the first input image that is closest to the first image position and has no image value assigned to it; and,
   if the second image position has the second image data value assigned to it, determining for the second input image position a second validity distance between the second image position and a second non-value image position of the second input image, which second non-value image position is an image position of the second input image that is closest to the second image position and has no image value assigned to it;
   wherein the weighting function is a function of the first validity distance and the second validity distance.

3. The method of claim 2, wherein the weighting function is a continuous function.

4. The method of claim 2, wherein the weighting function is a linear function of the first validity distance and the second validity distance.

5. The method of claim 2, wherein the weighting function has continuous derivatives of all orders.

6. The method of claim 2, wherein the weighting function is constant for a part of, but not all, values of the first validity distance and the second validity distance.

7. The method of claim 6, wherein the weighting function is constant if the first validity distance and the second validity distance are above a pre-determined distance threshold.

8. The method of claim 1, wherein the first input image has a first input depth map associated with it and the second input image a second input depth map associated with it, the method comprising, if the first input image position has a first image data value assigned to it and the second input image position has a second image data value assigned to it:
retrieving a first depth value from the input first depth map corresponding to the first input image position;
retrieving a second depth value from the second input depth map corresponding to the second input image position;
determining a depth difference between the first depth value and the second depth value;
determining which of the first input image position and the second input image position corresponds to a foreground object if the depth difference is above a pre-determined depth threshold; and
assigning an image data value to the synthesized image position that corresponds to an input image data value of the input image position corresponding to a foreground object.

9. The method of claim 1, wherein the first input image has a first input depth map associated with it and the second input image a second input depth map associated with it, the first input depth map comprising depth data values corresponding to first input image positions and the second input depth map comprising depth data values corresponding to second input image positions, the method further comprising:
determining whether the first input depth map has a first depth data value assigned to the first input image position;
determining whether the second input depth map has a second depth data value assigned to the second input image position;
assigning the first depth data value to a synthesized depth map position of a synthesized depth map if the first image position has the first depth data value assigned to it and the second image position has no depth data value assigned to it, the synthesized depth map being associated with the synthesized image and the synthesized depth map position corresponding to the synthesized image position;
assigning the second depth data value to the synthesized depth map position if the second image position has the second depth data value assigned to it and the first image position has no depth data value assigned to it;
assigning a synthesized depth data value to the synthesized depth map position if the first input image position has a first depth data value assigned to it and the second input image position has a second depth data value assigned to it, determining of the synthesized depth data value comprising:
determining a distance between the synthesized image position and a further image position where a corresponding further first input image position or a corresponding further second input image position does not have an depth data value assigned to it;
calculating the synthesized depth data value by calculating a weighted average of the first depth data value and the second depth data value, the weighting being a weighting function of the determined distance.

10. The method of claim 1, wherein the view is a three-dimensional view and the scene is a three-dimensional scene, the method comprising:
receiving a first raw input image representing a first raw view of the three-dimensional scene and a first raw depth map associated with the first raw input image;
receiving a second raw input image representing a second raw view of the three-dimensional scene and a second raw depth map associated with the second raw input image;
receiving a virtual camera position corresponding to a virtual view of the three-dimensional scene;
generating the first input image from the first raw input image by calculation of shifts of first image data positions associated with a change of view point from the first raw view to the virtual view; and
generating the second input image from the second raw input image by calculation of shifts of first image data positions associated with a change of view point from the second raw view to the virtual view.

11. The method of claim 1, wherein image data positions are single pixels.

12. The method of claim 1, wherein image data positions are groups of pixels.

13. A device for generating a synthesized image representing a view of a scene from a first input image representing the view and a second input image representing the view, the synthesized image comprising synthesized image positions by assigning a synthesized image data value to a synthesized image position, the device comprising a transceiver arranged to receive the first input image and the second input image and processing circuitry arranged to:
determine whether the first input image has a first image data value assigned to a first input image position of the first input image corresponding to the synthesized image position;
determine whether the second input image has a second image data value assigned to a second input image position of the second input image corresponding to the synthesized image position;
assign the first image data value to the synthesized image position if the first image position has the first image data value assigned to it and the second image position has no image data value assigned to it;
assign the second image data value to the synthesized image position if the second image position has the second image data value assigned to it and the first image position has no image data value assigned to it;
assign a synthesized image data value to the synthesized image position if the first input image position has a first image data value assigned to it and the second input image position has a second image data value assigned to it, determining of the synthesized image data value comprising:
determine a distance between the synthesized image position and a further image position where a corresponding further first input image position or a corresponding further second input image position does not have an image data value assigned to it; and calculate the synthesized image data value by calculating a weighted average of the first image data value and the second image data value, the weighting being a weighting function of the determined distance; and generate the synthesized image based on the calculated synthesized image data value.

14. A non-transitory computer-readable medium comprising, stored thereupon, a computer program for generating a synthesized image representing a view of a scene from a first input image representing the view and a second input image representing the view, the synthesized image comprising synthesized image positions, by assigning a synthesized image data value to a synthesized image position, the computer program comprising software instructions that, when executed by a computer, cause the computer to:

determine whether the first input image has a first image data value assigned to a first input image position of the first input image corresponding to the synthesized image position;

determine whether the second input image has a second image data value assigned to a second input image position of the second input image corresponding to the synthesized image position;

assign the first image data value to the synthesized image position if the first image position has the first image data value assigned to it and the second image position has no image data value assigned to it;

assign the second image data value to the synthesized image position if the second image position has the second image data value assigned to it and the first image position has no image data value assigned to it;

assign a synthesized image data value to the synthesized image position if the first input image position has a first image data value assigned to it and the second input image position has a second image data value assigned to it, determining of the synthesized image data value comprising:

determine a distance between the synthesized image position and a further image position where a corresponding further first input image position or a corresponding further second input image position does not have an image data value assigned to it; and calculate the synthesized image data value by calculating a weighted average of the first image data value and the second image data value, the weighting being a weighting function of the determined distance, and generate the synthesized image based on the calculated synthesized image data value.

* * * * *